United States Patent [19]

Plummer

[11] Patent Number: 5,268,625
[45] Date of Patent: Dec. 7, 1993

[54] ADAPTIVE CONTROL SERVOSYSTEMS

[75] Inventor: Andrew R. Plummer, Crawley, England

[73] Assignee: Dowty Aerospace Gloucester Limited, Gloucester, England

[21] Appl. No.: 797,332

[22] Filed: Nov. 25, 1991

[30] Foreign Application Priority Data

Nov. 24, 1990 [GB] United Kingdom ............... 9025584

[51] Int. Cl.$^5$ ............................................. G05B 13/04
[52] U.S. Cl. ................................. 318/610; 318/560; 364/162; 364/179
[58] Field of Search ........................... 318/609–618, 318/560–608; 364/148–166, 179

[56] References Cited

U.S. PATENT DOCUMENTS

| 4,195,337 | 3/1980 | Bertrand et al. | 318/561 X |
| 4,539,633 | 9/1985 | Shigemasa et al. | 318/561 X |
| 4,697,127 | 9/1987 | Stich et al. | 318/561 |
| 5,166,873 | 11/1992 | Takatsu et al. | 318/561 X |

*Primary Examiner*—Paul Ip
*Attorney, Agent, or Firm*—Young & Thompson

[57] ABSTRACT

A servosystem comprising an adaptive digital controller (1) with an input signal ($r_t$), an output control signal ($u_t$) to the system (2) being controlled, and an input feedback signal ($y_t$) from the system being controlled, the controller (1) incorporating an estimator (3) which operates recursively in response to the output control signal ($u_t$) and feedback signal ($y_t$) to estimate the values of parameters of a predetermined mathematical model (4) of the system being controlled and which makes use of a forgetting factor ($\lambda$) to weight previous values of said parameters before these values are used in combination with current values of said output control and feedback signals ($u_t$, $y_t$) in each recursive estimation cycle, said output control signal ($u_t$) being adapted in accordance with said estimated values of the parameters; characterised in that the controller (1) further incorporates an excitation monitor (3) which is responsive to the dynamic variability of the input demand and feedback signals ($r_t$, $y_t$) and operates to suspend adaptation of said output control signal ($u_t$) below a predetermined lower threshold of dynamic variability ($\alpha$) where the estimated process would otherwise have an adverse effect on said output control signal ($u_t$).

2 Claims, 12 Drawing Sheets

ADAPTIVE CONTROL SERVOSYSTEMS

TECHNICAL FIELD

This invention relates to the adaptive control of servosystems.

Electro-hydraulic servosystems combines the high power of hydraulic actuation with the versatility of electronic control. However in many circumstances simple analogue controllers are not sufficient to realise the full potential of the hydraulic system in terms of accuracy and dynamic performance. There are several reasons for this, for example, the hydraulic system exhibits significant non-linearities, so a linear model can only approximate the system behaviour at one operating point. Further, even at one operating point, the hydraulic system characteristics will often vary, for example due to changes in load behaviour or changes in oil temperature affecting viscosity.

As a result of these problems, sophisticated electronic digital controllers have been proposed for electro-hydraulic servosystems, especially position control systems. These controllers usually assume a linear system model, and incorporates an adaptation mechanism to cope with time-varying characteristics and some of the non-linearities.

Indirect (or self-tuning) adaptive control involves the on-line estimation of a system model, and uses a conventional model-based controller which is repeatedly re-designed using the latent estimated model. In its original form, self-tuning control was only used for the initial tuning of controller parameters. For a full adaptive version, the estimator must be modified to forget old data, for example by the inclusion of a fixed forgetting factor.

DISCLOSURE OF THE INVENTION

A servosystem according to the invention comprises an adaptive digital controller with an input demand signal, an output control signal to the system being controlled, and an input feedback signal from the system being controlled, the controller incorporating an estimator which operates recursively in response to the output control signal and feedback signal to estimate the values of parameters of a predetermined mathematical model of the system being controlled and which makes use of a forgetting factor to weigh previous values of said parameters before these values are used in combination with current values of said output control and feedback signals in each recursive estimation cycle, said output control signal being adapted in accordance with said estimated values of the parameters; characterised in that the controller further incorporates an excitation monitor which is responsive to the dynamic variability of the input demand and feedback signals and operates to suspend adaptation of said output control signal below a predetermined lower threshold of dynamic variability where the estimation process would otherwise have an adverse effect on said output control signal.

DESCRIPTION OF THE DRAWINGS

The invention will now be described by way of example with reference to the accompanying drawings in which.

MODE OF CARRYING OUT THE INVENTION

Figure 1:
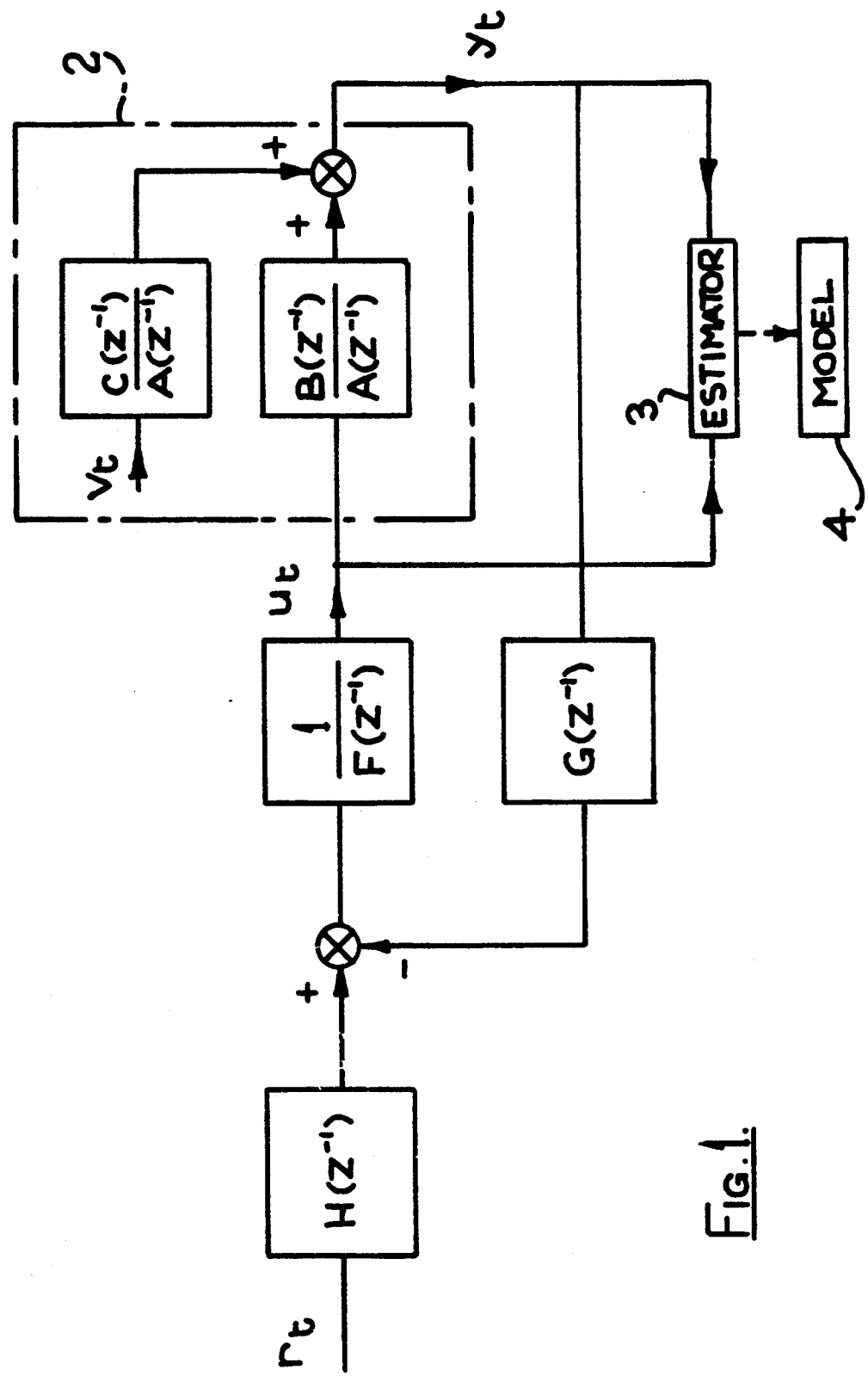
FIG. 1 is a schematic diagram of a pole placement controller, according to the present invention.
Figure 2:
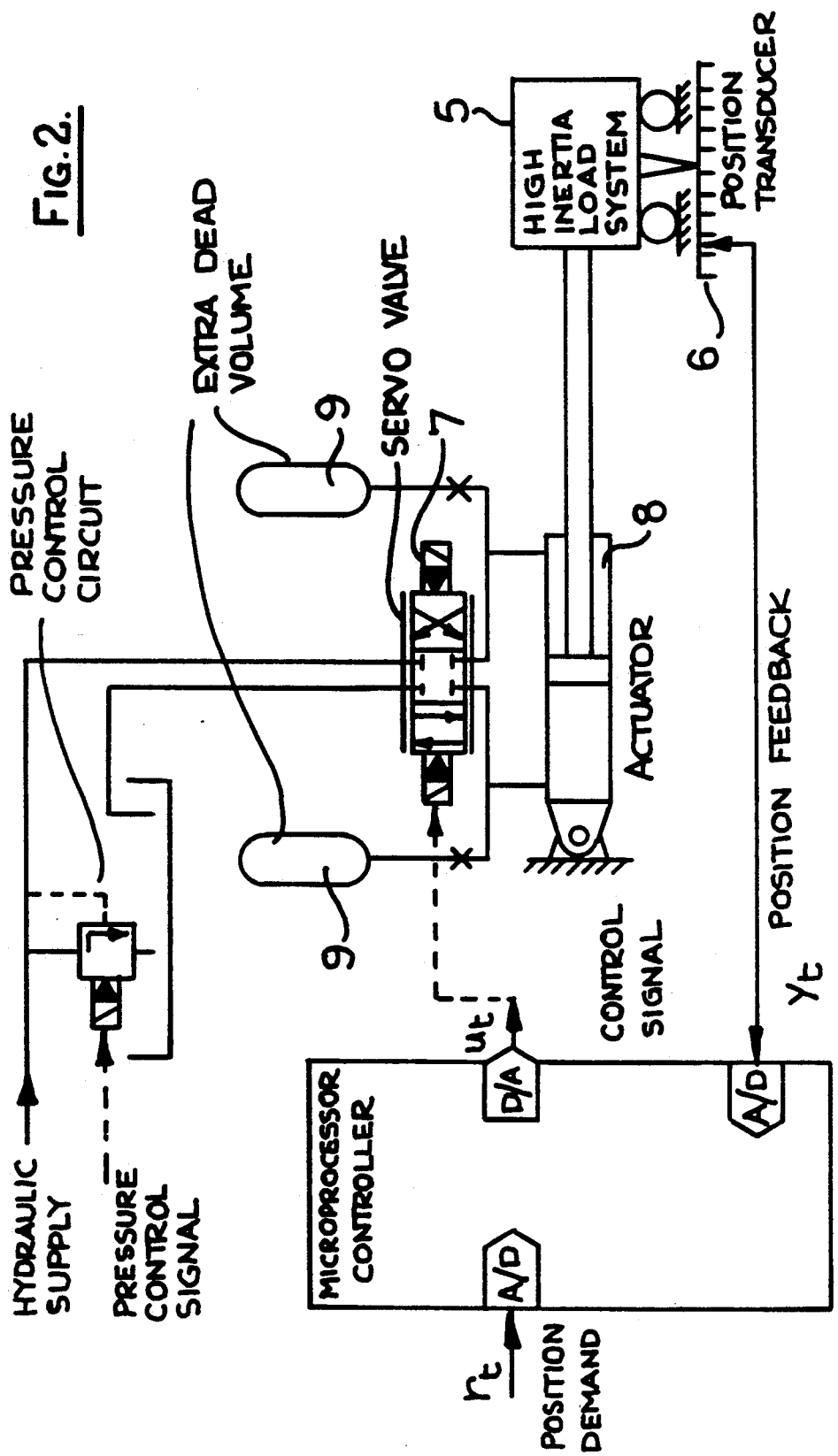
FIG. 2 is a schematic diagram of an electro-hydraulic position control system incorporating the controller of FIG. 2.

An indirect (self tuning) adaptive controller 1 according to the invention is shown schematically in FIG. 1 as applied to an electro-hydraulic positioning system 2 which is shown in more detail in FIG. 2. The controller 1 employs pole placement as the control method and incorporates an estimator 3 (implemented in the controller software) that estimates the parameters of a mathematical model 4 of the electro-hydraulic system using the method of recursive least squares. A demand signal $r_t$ corresponding to the required position of a load 5 forms one input to the controller 1, and a feedback signal $y_t$ from a position transducer 6 associated with the load 5 forms a second input to the controller 1. These input signals $r_t$, $y_t$ are used by the estimator to calculate values of the model parameters which are then used to adapt an input control signal $u_t$ which controls operation of the servovalve 7 of the system and thereby the positioning of the load 5.

In the analysis of the operation of the controller that follows, the following notation is used:

| Notation | |
|---|---|
| $a_i$ | Coefficient in $A(z^{-1})$ |
| $A(z^{-1})$ | Plant model denominator polynomial: $A(z^{-1}) = 1 + a_1 z^{-1} + a_2 z^{-2} + \ldots + a_n z^{-n}$ |
| $b_i$ | Coefficient in $B(z^{-1})$ |
| $B(z^{-1})$ | Plant model numerator polynomial: $B(z^{-1}) = b_1 z^{-1} + b_2 z^{-2} + \ldots + b_m z^{-m}$ |
| $C(z^{-1})$ | Noise model, of the form: $C(z^{-1}) = 1 + c_1 z^{-1} + c_2 z^{-2} + \ldots$ |
| deg | Degree of polynomial (i.e. highest power) |
| $e_t$ | Noise signal at sample instant t |
| $F(z^{-1})$ | Controller forward path term, of the form: $F(z^{-1}) = f_o + f_1 z^{-1} + f_2 z^{-2} + \ldots$ |

-continued

| Notation | |
|---|---|
| $G(z^{-1})$ | Controller feedback path term, of the form: $G(z^{-1}) = g_o + g_1 z^{-1} + g_2 z^{-2} + \ldots$ |
| $H(z^{-1})$ | Controller demand filter, of the form: $H(z^{-1}) = 1 + h_1 z^{-1} + h_2 z^{-2} + \ldots$ |
| i | An integer |
| k | Controller gain correction factor |
| $\underline{k}_t$ | Estimator gain vector at recursion t |
| m | Degree of $B(z^{-1})$ polynomial |
| n | Degree of $A(z^{-1})$ polynomial |
| $\underline{P}_t$ | Normalized covariance matrix estimate at recursion t |
| t | Time as a number of sample intervals |
| $r^t$ | Demand signal at sample instant |
| tr | Trace of matrix (i.e. sum of leading diagonal elements) |
| $T(z^{-1})$ | Polynomial with roots which are desired closed-loop poles, of the form: $T(z^{-1}) = 1 + t_1 z^{-1} + t_2 z^{-2} + \ldots$ |
| $u_t$ | Plant input signal at sample instant t |
| $\underline{u}_t$ | Filtered plant input $u_t$ |
| $v_t$ | White noise signal |
| $y_t$ | Plant output signal at sample instant t |
| $\underline{y}_t$ | Filtered plant output $y_t$ |
| $\alpha$ | Covariance trace limit |
| $\underline{\phi}_t$ | Regressor vector at sample instant t |
| $\underline{\psi}_t$ | Regressor vector based on filtered signals at sample instant t |
| $\lambda$ | Forgetting factor |
| $\underline{\theta}$ | Vector of model parameters |
| $\underline{\hat{\theta}}_t$ | Estimate of model parameter vector at recursion t |

The superscripts have the following meaning:

| | |
|---|---|
| T | Transpose |
| ˆ | Estimate of |

POLE PLACEMENT CONTROLLER

For the purpose of analysis, the electro-hydraulic positioning system, hereinafter referred to as "the plant", is represented by:

$$A(z^{-1})y_t = B(z^{-1})u_t + e_t \quad (1)$$

where $y_t$ is the plant output, $u_t$ the plant input, $e_t$ is a noise signal, and $$A(z^{-1}) = 1 + a_1 z^{-1} + \ldots + a_n z^{-n}$$

$$B(z^{-1}) = b_1 z^{-1} + b_2 z^{-2} + \ldots b_m z^{-m}$$

Any dead time in the plant is incorporated in the $B(z^{-1})$ polynomial (for example dead time of one sample interval would give $b_1 = 0$). If $e_t$ is coloured noise, then $$e_t = C(z^{-1})v_t$$

where $v_t$ is a white noise sequence, and $C(z^{-1})$ is the noise model.

The pole placement controller is implemented using three digital filters as shown in FIG. 1. The control signal is generated thus:

$$u_t = (H(z^{-1})r_t - G(z^{-1})y_t)/F(z^{-1}) \quad (2)$$

The resulting closed-loop response is:

$$y_t = \frac{B(z^{-1})H(z^{-1})}{F(z^{-2})A(z^{-1}) + G(z^{-1})B(z^{-1})} r_t + \quad (3)$$

$$\frac{F(z^{-1})C(z^{-1})}{F(z^{-1})A(z^{-1}) + G(z^{-1})B(z^{-1})} v_t$$

If $A(z^{-1})$ and $B(z^{-1})$ are known exactly, then $F(z^{-1})$ and $G(z^{-1})$ can be calculated to satisfy:

$$F(z^{-1})A(z^{-1}) + G(z^{-1})B(z^{-1}) = kT(z^{-1})H(z^{-1}) \quad (4)$$

Substituting equation (4) into (3):

$$y_t = \frac{B(z^{-1})}{kT(z^{-1})} r_t + \frac{F(z^{-1})C(z^{-1})}{kT(z^{-1})H(z^{-1})} v_t \quad (5)$$

Thus $T(z^{-1})$ is the closed-loop characteristic polynomial relating demand to output. It has a unity $z^0$ coefficient and roots which are the closed-loop system poles specified by the user. The scalar k is used to give unitary steady state gain, i.e.

$$k = B(1)/T(1) \quad (6)$$

As can be seen from equation (5) the demand filter $M(z^{-1})$ only appears in the transfer function from noise to output, and it can be used to attenuate noise without affecting servo performance. Thus $1/M(z^{-1})$ can be any stable filter specified by the user. The presence of the demand filter also improves the robustness of the controller to modelling errors.

For the simplest controller, the solution to (4) which gives polynomials $F(z^{-1})$ and $G(z^{-1})$ of minimum degree is required. This is achieved by using:

deg $F(z^{-1}) = m - 1$ (i.e. m coefficients)

deg $G(z^{-1}) = n - 1$ (i.e. n coefficients)

and deg $\{T(z^{-1})H(z^{-1})\} = n + m - 1$

Thus equating equal powders of $z^{-1}$ in (4) gives $n + m$ equations, and there are $n + m$ unknown $F(z^{-1})$ and $G(z^{-1})$ coefficients, so there is a unique solution. If the closed-loop characteristic polynomial is chosen to have the same degree as the open-loop one, then:

deg $T(z^{-1}) = n$ and deg $H(z^{-1}) = m - 1$

ESTIMATION

I order to present a method for estimating plant model parameters, it is useful to re-write equation (1) as a regression equation:

$$y_t = \underline{\phi}_t^T \underline{\theta} + e_t \quad (7)$$

where
$\underline{\phi}_t^T = [y_{t-1}, \ldots, y_{t-n}, u_{t-1}, \ldots, u_{t-m}]$ is a vector of input-output data (— the regressor vector),
and $\underline{\theta} = [-a_1, \ldots, -a_n, b_1, \ldots, b_m]^T$ is a vector of model parameters.

The model parameters can be estimated from sampled data using the least squares estimator. However it is well known that if any regressor (element of $\phi_t$) is correlated with the noise signal $e_t$, then the least squares estimates are biased. In practice $e_t$ is usually autocorrelated (i.e. coloured), and hence also correlated with the past values of output which appear as regressors. In the presence of feedback the past values of input which appear as regressors will also be correlated with an autocorrelated $e_t$. Thus the least squares estimates will be biased.

Consider equation (7). If the input and output signals were filtered by the reciprocal of the noise model, they would be related by:

$$y_t' = \psi_t^T \theta + v_t \quad (8)$$

where $\psi_t^T = [y_{t-1}', \ldots, y_{t-n}', u_{t-1}', \ldots, u_{t-m}]$ is the new regressor vector, and $$y_t' = \frac{1}{C(Z^{-1})} y_t$$

$$u_t' = \frac{1}{C(Z^{-1})} u_t$$

As the noise signal $v_t$ in the new regression equation is white, it is not correlated with the regressors, and the least squares estimates will not be biased. However in practice the noise model is unknown, but using engineering judgment to design a filter to attenuate noise in the signals is sufficient to improve the estimates.

Using filtered input-output signals, the recursive least squares (RLS) estimate $\theta_t$ of the model parameter vector $\theta$ (based on data up to sample time t) can be shown to be:

$$\begin{aligned} \theta_t &= \theta_{t-1} + k_t(y_t' - \psi_t^T \theta_{t-1}) & \text{(a)} \\ \text{where} \quad k_t &= P_{t-1} \psi_t (\lambda + \psi_t^T P_{t-1} \psi_t)^{-1} & \text{(b)} \\ \text{and} \quad P_t &= (P_{t-1} - k_t \psi_t^T P_{t-1})/\lambda & \text{(c)} \end{aligned} \quad (9)$$

$\underline{P}_t$ is a normalised version of the covariance matrix of the estimates, and $\lambda$ is the forgetting factor ($0 < \lambda \leq 1$).

If the plant was not time-varying, the forgetting factor would be set to unity. Data at each sample instant would then have the same importance, and the elements of the covariance matrix $\underline{P}_t$ would reduce in size as more data is introduced, reflecting greater confidence in the accuracy of the estimates. Notice from (9a) that $\underline{k}_t$ acts as a gain determining how much the estimates change for a given error between (filtered) actual and model outputs. In addition, it can be shown that $$k_t = P_t \psi_t \quad (10)$$

so $\underline{P}_t$ directly influences the rate of change of the estimates, and as it reduces, the estimates converge to steady values.

For time-varying plant, the reduction in $\underline{P}_t$ means that the model will take progressively longer to adapt to changes in the plant. Thus traditionally a forgetting factor just below unity is used for this situation. This has most effect on equation (9c), where $\underline{P}_t$ is scaled up on each recursion to counteract its tendency to diminish. The forgetting factor can also be interpreted as a means of weighing old data to have less importance than new data; the significance of data from a particular sample instant decays exponentially as time progresses with time constant $1/(1-\lambda)$ sample intervals.

Problems are encountered with the use of a fixed forgetting factor if the data is not persistently exciting. During periods of low excitation, new data does not drive $\underline{P}_t$ any lower, yet the matrix is still being scaled up by the forgetting factor. Thus $\underline{P}_t$ can become very large, and the estimates are sensitive to small model output errors, often changing drastically in the presence of noise.

As an alternative to a fixed forgetting factor, the constant trace algorithm has been used. In essence, the forgetting factor is set to unity in (9b), but varied in (9c) to maintain $\underline{P}_t$ at a constant size. The trace of $\underline{P}_t$ is used as a scalar measure of the size of the matrix. However in practice this method does not entirely solve the problem. During long periods of insufficient excitation, the parameter values which can fit the model to the data are not unique, and the estimates tend to drift.

To overcome these difficulties, a technique is used which employs a fixed forgetting factor, and which in addition switches off the estimator if the excitation is insufficient. The excitation is deemed to be insufficient if the trace of $\underline{P}_t$ reaches some user specified limiting value. Thus trace limited RLS is given by equation (9) with the following extension if tr $\underline{P}_t \geq \alpha$ then $$\underline{P}_t = (\alpha/\text{tr}\underline{P}_{t-1})\underline{P}_{t-1} \quad (11)$$

$$\theta_t = \theta_{t-1}$$

where $\alpha$ is the trace limit.

The forgetting factor $\lambda$ can now be re-interpreted: considering the algorithm in the trace limited state, the lower the value of $\lambda$, the more exciting the data must be before adaptation occurs. Also the higher the value of $\alpha$, the higher $\underline{P}_t$ (and $\underline{k}_t$) can become before adaptation is switched off, allowing the model to adapt more rapidly.

COMPUTER IMPLEMENTATION

The digital computer system used for implementing the adaptive controller has the following features:

Main processor card: 20 MHz T800 Inmos Transputer (10 Mbits/s links) plus 2 Mbytes DRAM.

Host: IBM AT-compatible providing user interface.

12-bit, 8-channel, 5 µs conversion, 10 µs communication (via transputer link). No anti-aliasing filters.

12-bit, 4-channel, 8 µs settling time, 10 µs communication (via transport link).

Language: 3L Parallel C. 64 bit floating-point arithmetic used throughout.

To implement the adaptive control for the system as described hereinafter, about 3 ms computation time was required per sample. However the software was written for the general case (i.e. for any model etc.), and contained many monitoring functions. Optimising the software for speed would probable cut the computation time by about half.

THE ELECTRO-HYDRAULIC POSITIONING SYSTEM

The adaptive controller has been applied by way of example only, to an electro-hydraulic positioning system. The system consists of a servovalve-controlled cylinder 8 driving a large inertial load 5, as shown in FIG. 2. It has the following specification:

Valve:
  Dowty series 4551
  Bandwidth greater than 50 Hz
  Flow gain (at 70 bar) 3.8(L/min)/mA
  Saturation at 9 mA
Cylinder:
  Stroke 610 mm
  Piston area 2025 mm$^2$
  Annulus area 1380 mm$^2$
Load:
  890 kg mass
  Very low damping
Position feedback:
  Wirewound potentiometer
  Zero at centre stroke
  Retract is positive direction
Supply pressure:
  Variable to 160 bar The system is very oscillatory due to the interaction between the large inertia and the oil compliance, with a resonance at centre stroke of about 12 Hz. Two dead volumes of oil 9 can be switched into the hydraulic circuit either side of the cylinder, and this reduces the resonant frequency to about 7 Hz due to the extra oil compliance.

In reality the plant is non-linear, and correct values for the parameters in a linear model do not exist. The non-linear behaviour arises from several sources, including:

a directional non-linearity due to the single-ended cylinder,
  the square low relationship for the valve between pressure and flow,
  different characteristics in different parts of the stroke due to volume changes,
  saturation in the servovalve, and
  backlash in the mountings in the cylinder body and rod.

The main effect of the directional non-linearity is a larger gain when the load is driven in the extend direction as opposed to the retract direction. This is compensated for in software by scaling the valve control signal differently according to its sign. This non-linear compensation is undertaken just before the control signal is sent to the plant, and the signal passing into this compensation stage can be considered as the plant input. Thus conceptually the compensation is part of the plant itself.

The servovalve saturation non-linearity can be neglected if the valve is never allowed to saturate. This can be achieved by limiting the control signal in software to be just within the level which saturates the valve. Hence the signal used for the plant input by the estimator and for calculating the next control signal will always be closely related to the actual opening of the valve.

SETTING UP THE ADAPTIVE CONTROLLER

Before the adaptive controller can be applied to any servosystem, choices have to be made regarding the structure of the plant model, the sample rate, the forgetting factor and trace limit for the estimator forgetting strategy, the position of the closed-loop poles etc. To help with these choices it is very desirable to undertake some off-line system identification work.

Figure 3:
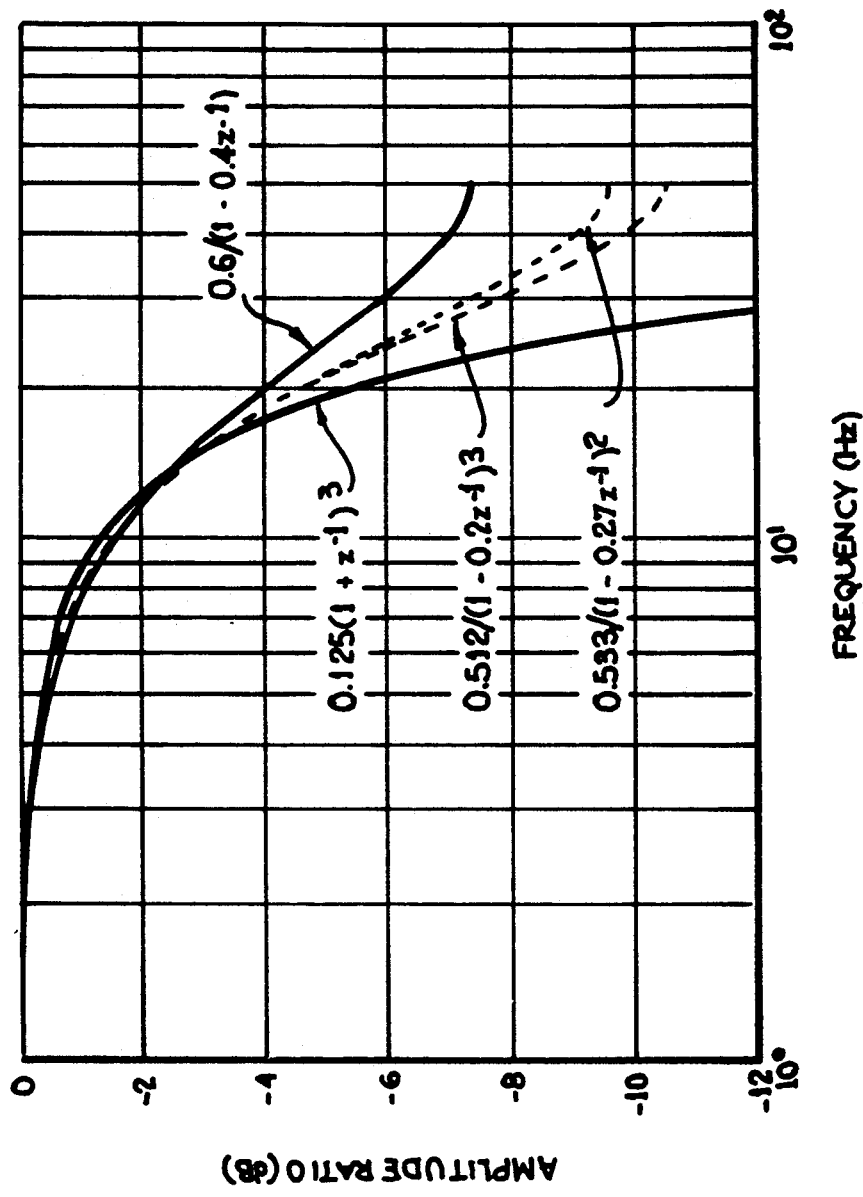
FIG. 3 shows the frequency response of some digital filters with break points at 15 Hz (10 ms sample intervals) used in the controller of FIG. 1.

Input-output data are collected for the positioning system using a pseudo-random binary sequence (PRBS) input signal, with the plant operating in open-loop near mid-stroke at 100 bar supply pressure. A 10 ms sample interval is used, giving a sample rate about 8 times the bandwidth of the plant (interpreting the bandwidth as the point at which resonance occurs, in this case 12 Hz). A least squares estimator processing filtered data is used to estimate models of the plant off-line. The data filter is chosen to attenuate noise and high order dynamics above the plant bandwidth. The frequency responses of several digital filters with 3 dB break points at 15 Hz are shown in FIG. 3. The third order filter $0.125(1+z^{-1})^3$ was selected as it gives rapid roll-off, with a gain of zero at the Nyquist frequency (50 Hz). Note that this particular choice of filter has not been found to be essential for successful estimation.

Figure 4:
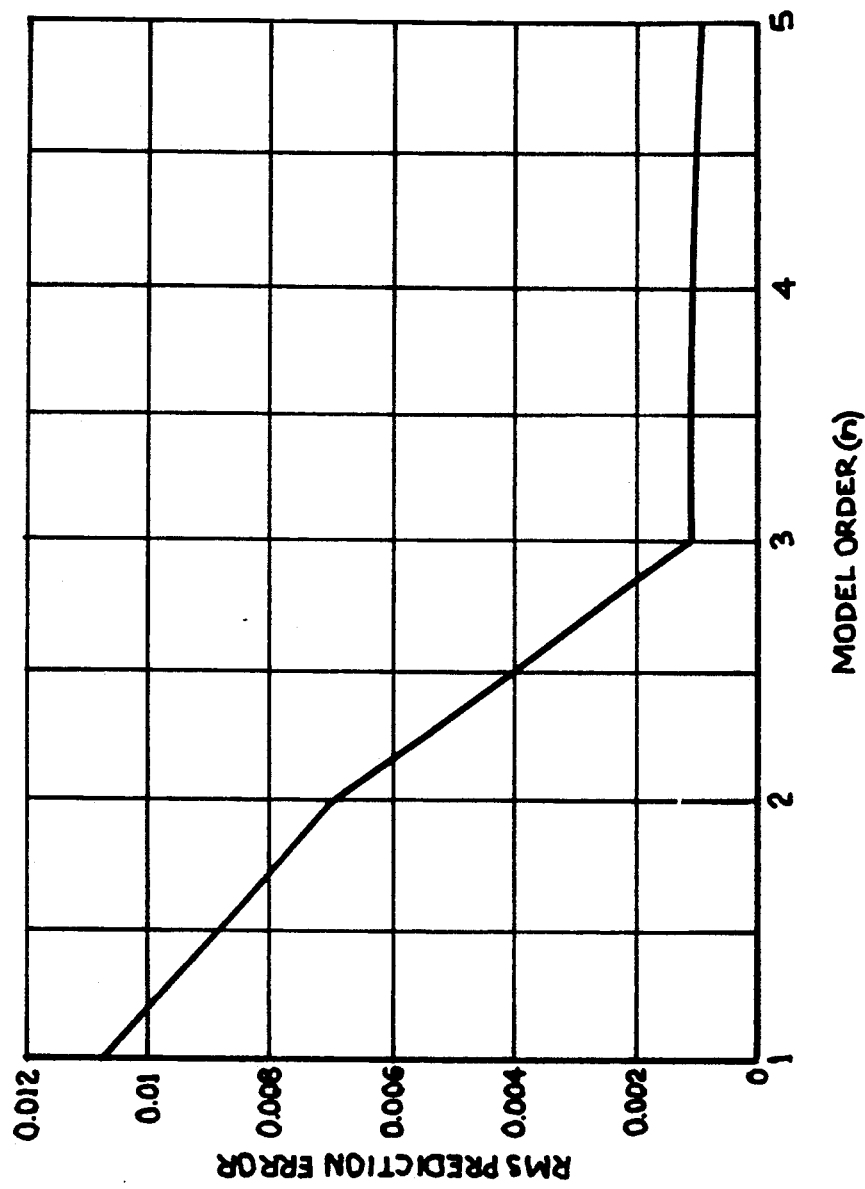
FIG. 4 shows a graph of prediction error comparison for model structure selection, in the controller of FIG. 1.

Before the parameters in an off-line model can be estimated, a model structure has to be selected. If n or m (the estimated degrees of $A(z^{-1})$ and $B(z^{-1})$ respectively are too small, the model will not be able to represent the plant behaviour adequately. If n and m are both too large, the estimates of $A(z^{-1})$ and $B(z^{-1})$ will tend to have common roots, in which case the controller design equation (4) cannot be solved (assuming the common roots are not also roots of $T(z^{-1})H(z^{-1})$). However to simplify the problem, n and m can be equated, and if this single order is equal to the largest of the true degrees n and m, the plant behaviour can be modelled well without the danger of pole-zero cancellation. To select an appropriate model order, models for a range of orders are estimated from 400 data samples, and an RMS average of the prediction errors between model and actual output for each order are calculated. These are plotted in FIG. 4. The rapid reduction in error up to order 3, followed by virtually no further reduction, indicates that a third order model is appropriate.

Thus the following third order model is identified:

$$y_t = \frac{(1.07z^{-1} + 3.78z^{-2} + 3.27z^{-3})10^{-3}}{1 - 2.37z^{-1} + 2.28z^{-2} - 0.909z^{-3}} u_t \qquad (12)$$

Factorizing the numerator and denominator polynomials gives:

$$y_t = \frac{1.07z^{-1}(1 + 1.50z^{-1})(1 + 2.04z^{-1})10^{-3}}{(1 - 1.00z^{-1})(1 - (0.684 + 0.664j)z^{-1})(1 - (0.684 - 0.664j)z^{-1})} u_t \qquad (13)$$

In order to design a controller which can adapt as rapidly as possible to changes in the plant, the number of parameters estimated on-line are reduced to a minimum. The pole at $z=1$ in the above model represents the inherent integrating nature of the plant, and is unlikely to change. Also the zeros play a very minor role in modelling the dynamics of the plant, so they are fixed without seriously restricting the time-variations to which the model can adapt. Thus the on-line estimator processes $(1+1.50\ z^{-1})(1+2.04\ z^{-1})u_t'$ as the input signal and $(1-z^{-1})y_t'$ as the output to estimate a model of the form:

$$\frac{b_1 z^{-1}}{1 + a_1 z^{-1} + a_2 z^{-1}} \quad (14)$$

Note that the position on the z-plane of the fastest poles in the model (13) can be used to check the suitability of the sample rate used. In this case the poles are at $z=0.684\pm0.664$j, which indicates a sample rate of 8.13 times the natural frequency of the plant (giving the latter as 12.3 Hz).

Offline estimation yielded initial values for the parameters and the covariance matrix, so that the adaptive controller is well behaved at start-up. To obtain the covariance matrix for a model of the form (14), the estimator is re-run for this model. The off-line estimates (from 400 samples of data) are:

$a_1 = -1.37$
$a_2 = 0.907 \quad P_t =$
$b_1 = 1.07 \times 10^{-3}$ $$\begin{bmatrix} 51.3 & -34.4 & -5.66 \times 10^{-2} \\ -34.4 & 42.3 & 2.61 \times 10^{-3} \\ -5.66 \times 10^{-2} & 2.61 \times 10^{-3} & 3.66 \times 10^{-4} \end{bmatrix}$$

The trace of the covariance matrix above is 93.6. This is used as a guide to choosing the trace limit ($\alpha$). In this case $\alpha = 200$ was selected. The forgetting factor ($\lambda$) is chosen experimentally to be 0.92. This value prevented adaption when the plant is driven by any insufficiently exciting signal.

To simplify the choice of closed-loop pole positions, three first order poles in the same place are used. Placing the poles at $z=0.6$ gave an acceptable speed of response. Similar criteria apply to the choice of demand filter as to the estimation filter; two first order roots are used, both at $z=0.3$. Thus $$T(z^{-1})=(1-0.6 z^{-1})^3$$

and $$H(z^{-1})=(1-0.3 z^{-1})^2$$

The same data filter was used for on-line estimation as well as for off-line estimation.

SYSTEM PERFORMANCE

Figure 5:
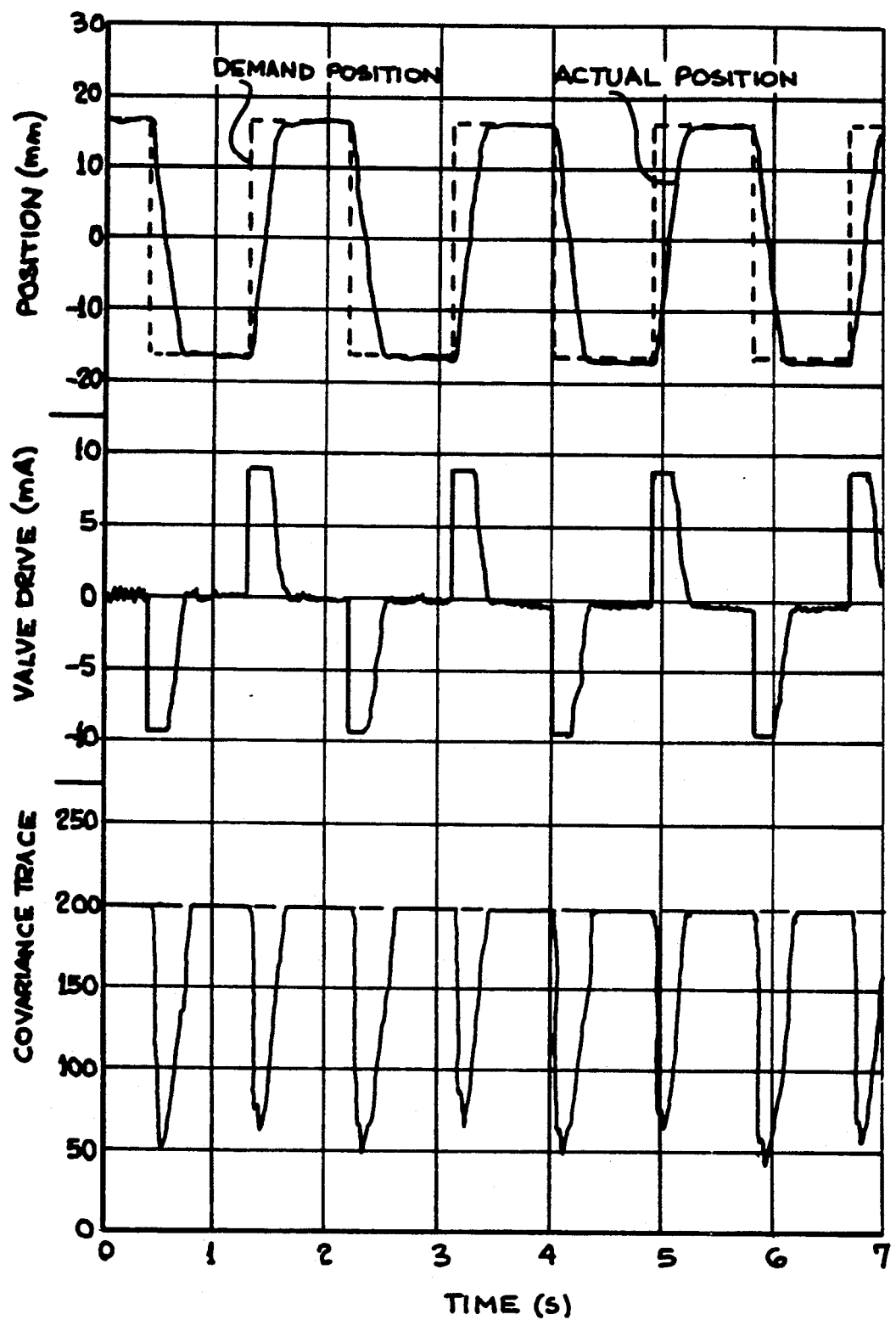
FIG. 5 shows the response of the controller of FIG. 1 with steady 100 bar supply pressure (no dead volumes)
Figure 6:
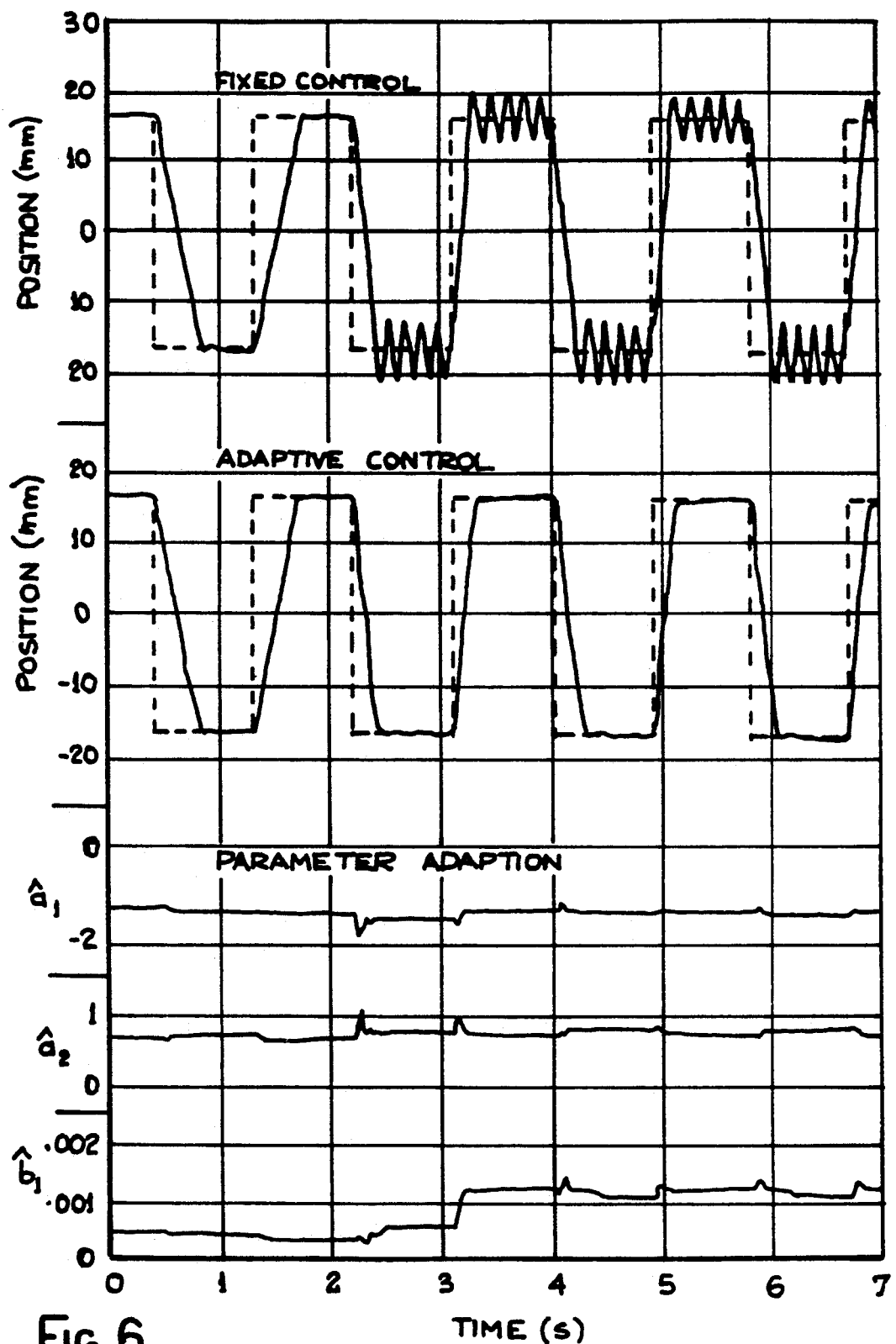
FIG. 6 shows the control action of the controller of FIG. 1 with increase in supply pressure from 40 bar to 160 bar after 2 seconds (no dead volumes)
Figure 7:
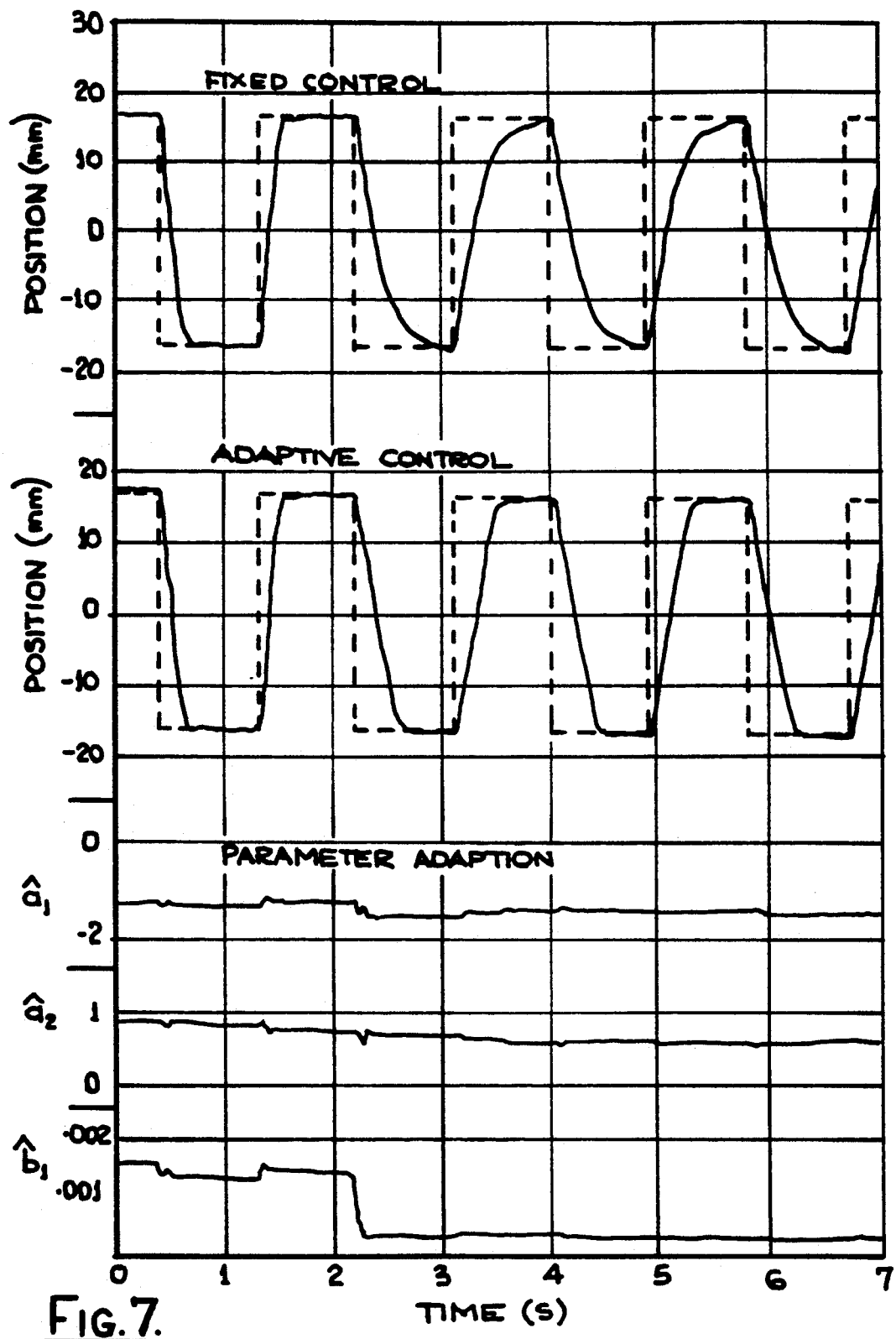
FIG. 7 shows the control action of the controller in FIG. 1 with decrease in supply pressure from 160 bar to 40 bar after 2 seconds (no dead volumes)

FIG. 5 shows the response of the adaptive controller to a square wave demand input. When the actual load position reaches the demand position in the steady state, the covariance trace quickly reaches its limiting value and adaptation is switched off. FIG. 6 illustrates the behaviour of the adaptive controller when there is an increase in supply pressure. A fixed pole placement controller (with the same desired closed-loop poles and demand filter) is also shown for comparison. Both controllers are initially well tuned for the starting pressure of 40 bar. After 2 s the pressure is suddenly increased to 160 bar. The fixed controller becomes very oscillatory, but the adaptive controller fully adapts to the new pressure within one period of the demand cycle. FIG. 7 illustrates a similar effect when the pressure is reduced from 160 bar to 40 bar, with both fixed and adaptive controllers starting well tuned for the higher pressure. Changes in pressure are similar to changes in load damping.

Figure 8:
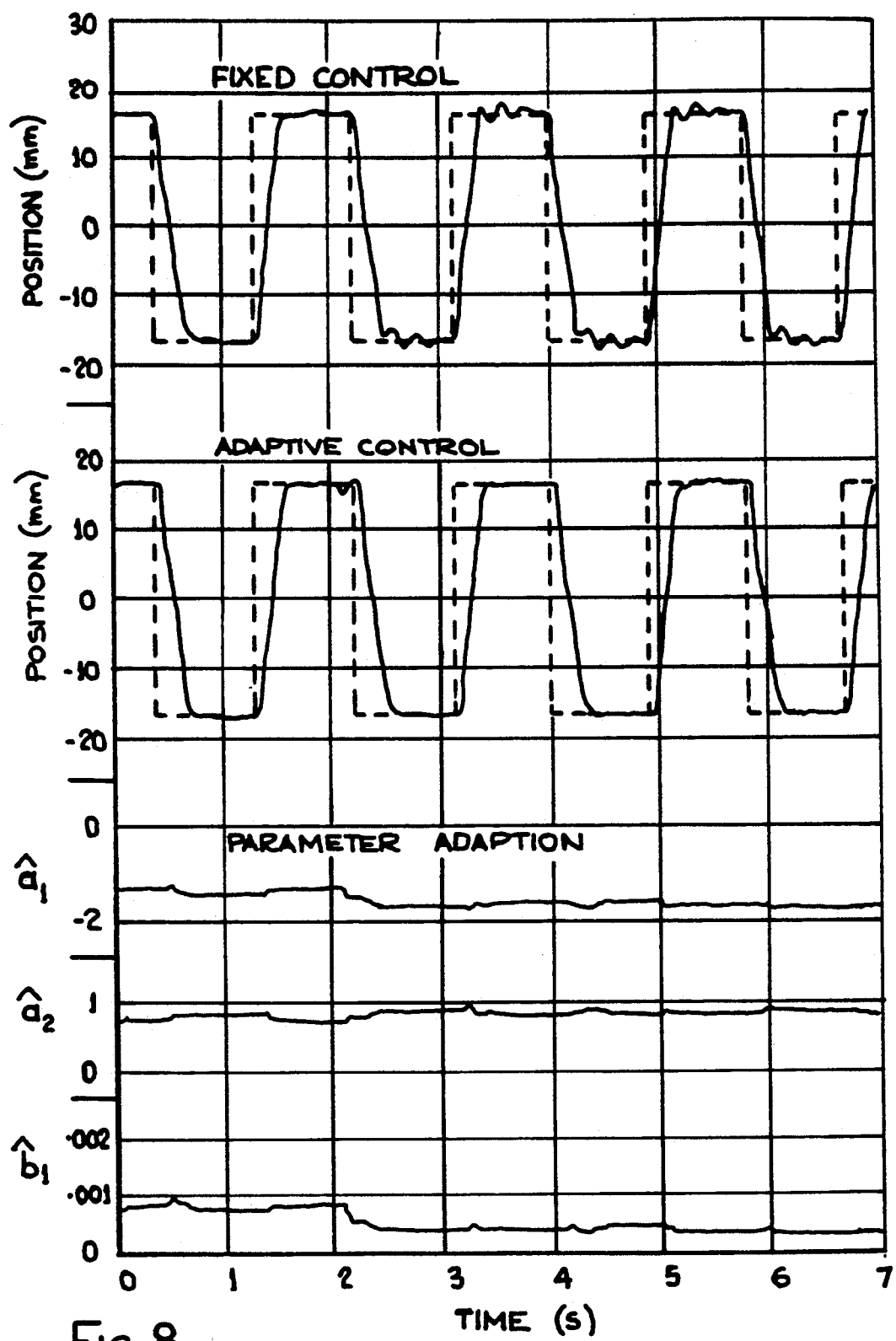
FIG. 8 shows the control action of the controller of FIG. 1 with dead volumes switched in after 2 seconds (100 bar supply pressure)
Figure 9:
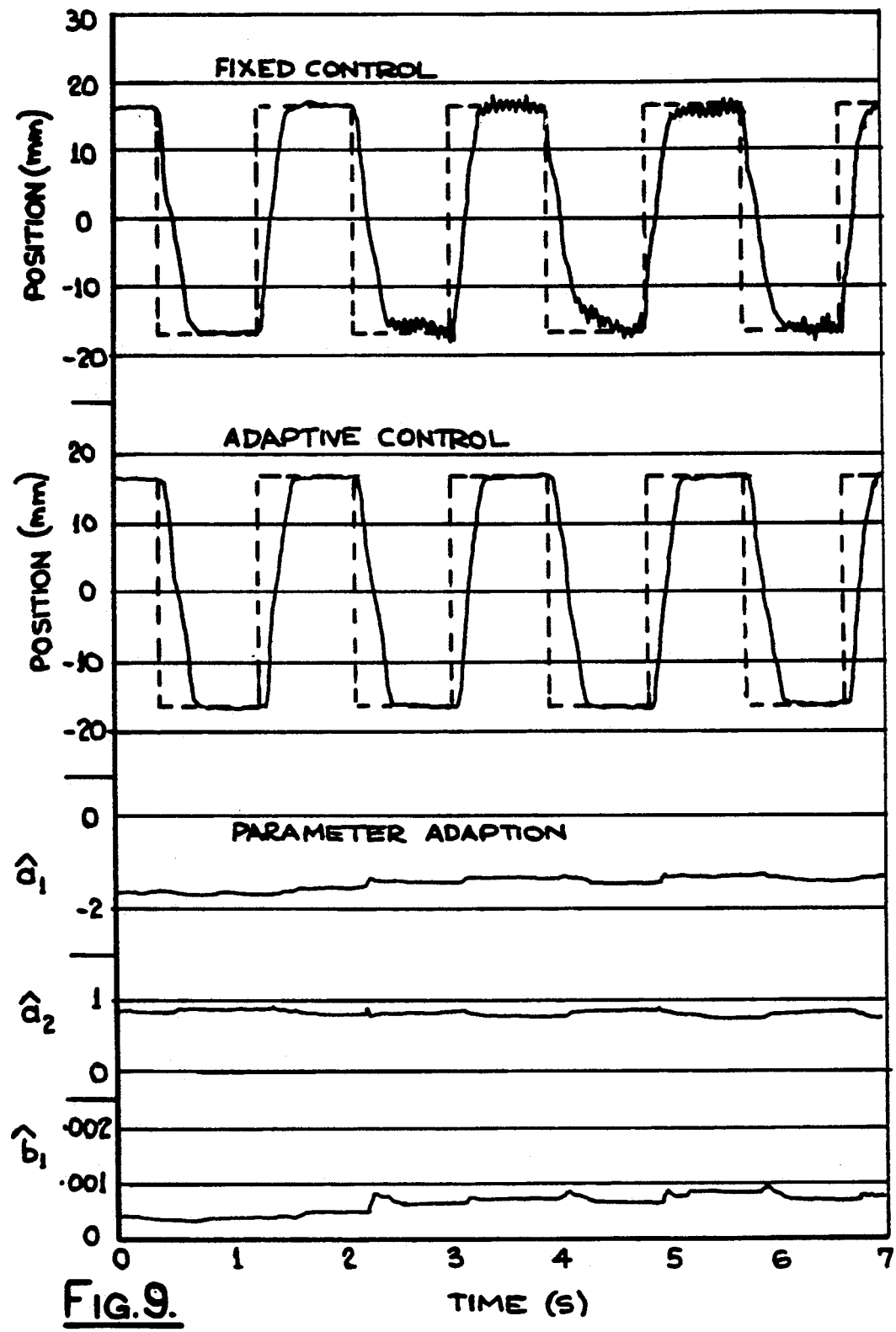
FIG. 9 shows the control action of the controller of FIG. 1 with dead volumes switched out after 2 seconds (100 bar supply pressure)

In FIG. 8 the supply pressure is kept constant at 100 bar. After 2 s the dead oil volumes 9 are switched into the circuit. This reduces the natural frequency of the plant in much the same way as an increase of load mass would. The adaption is again very rapid. FIG. 9 shows the reverse situation, where the extra oil volume is initially present, and is removed after 2 s. The fixed controller develops a high frequency limit cycle (the control signal is oscillating between the two saturation levels), but the adaptive controller performs well. Notice that the estimates do show some adaptation to the difference in plant behaviour between when the cylinder is extending and retracting.

Figure 10:
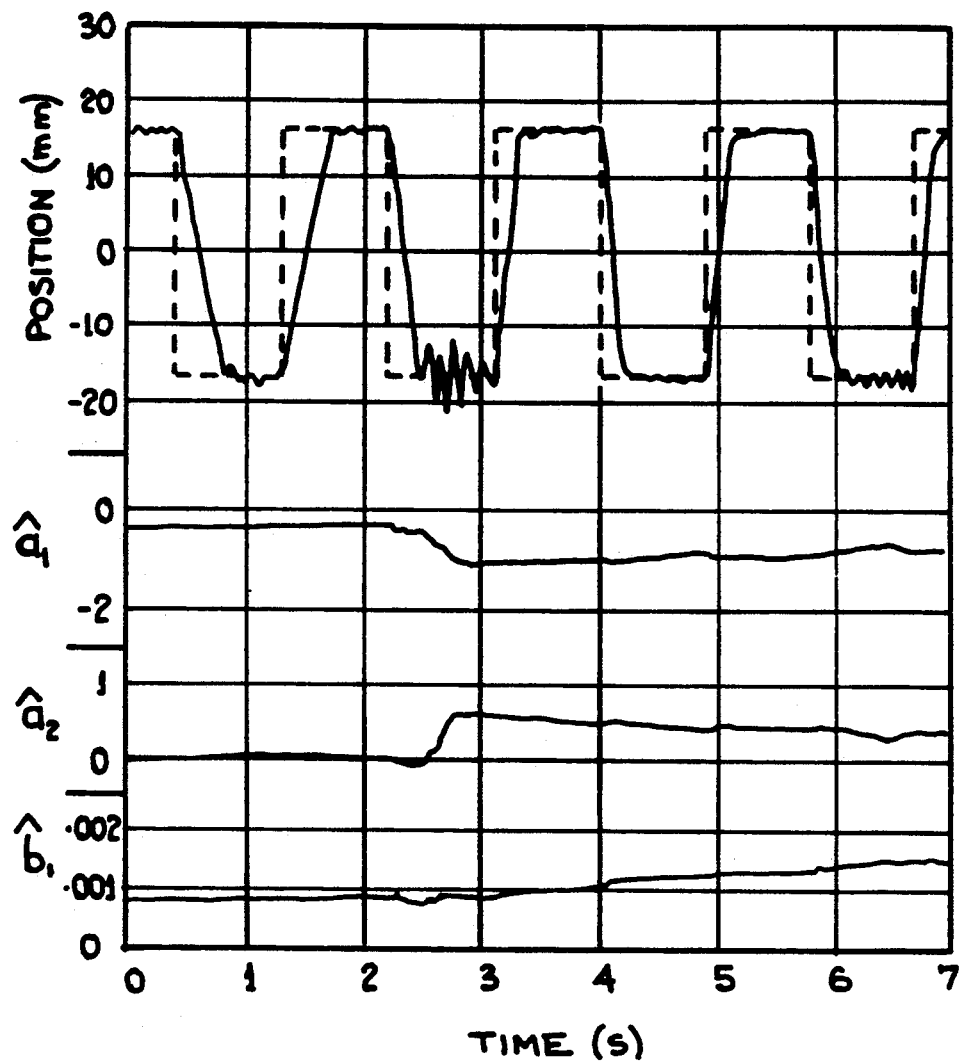
FIG. 10 shows the control action of the controller of FIG. 1 under the same conditions as in FIG. 6 but with no estimation filter.

FIG. 10 illustrates the performance of the adaptive controller when the input and output signals are not filtered before estimation. The parameter estimates exhibit more bias and slower convergence, resulting in the poor response to the controller. Note that increasing $\lambda$ to 0.99 was found to be most appropriate with no estimation filtering, and so this value was used for the results shown.

Figure 11:
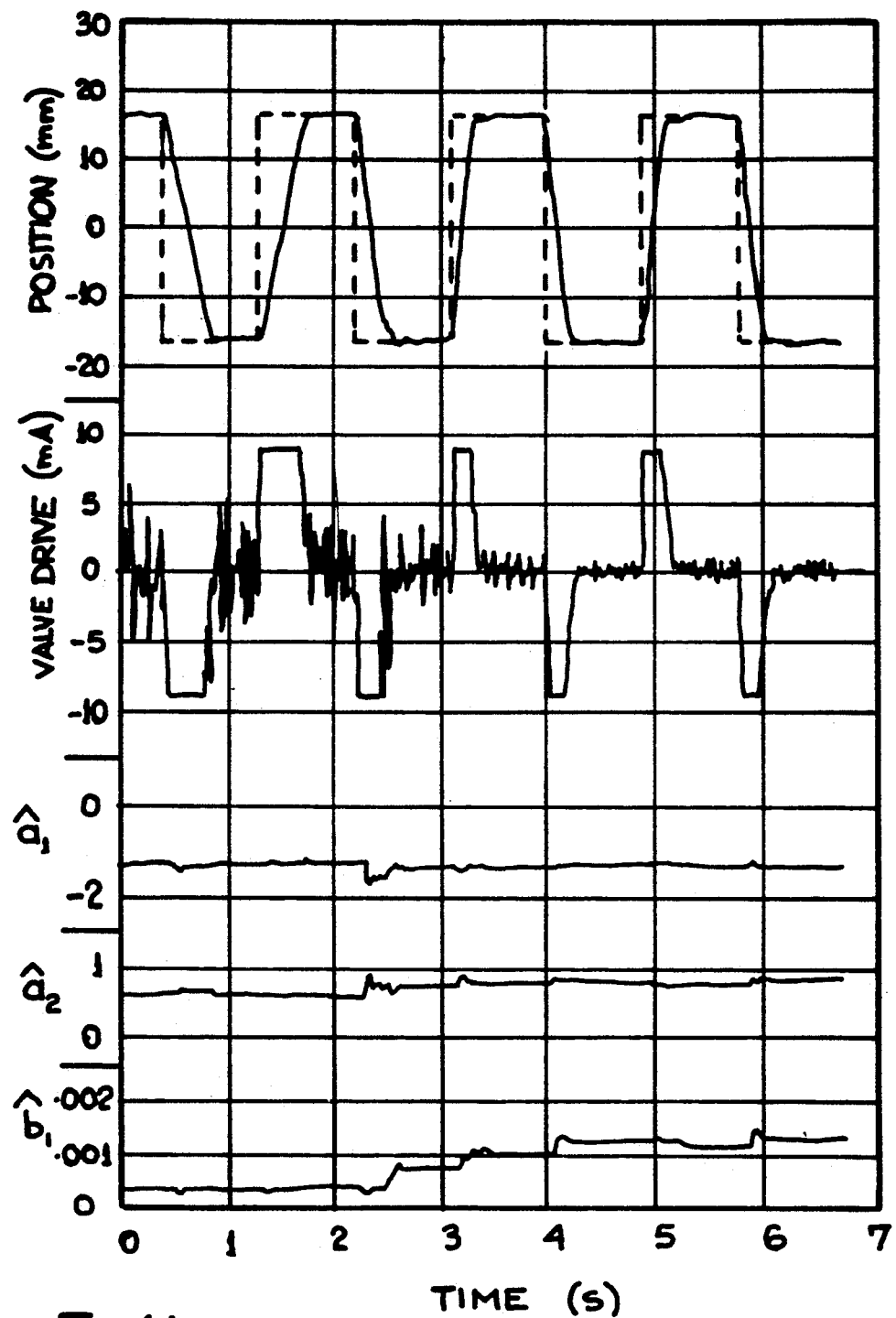
FIG. 11 shows the control action of the controller of FIG. 1 under the same conditions as in FIG. 6 but with no demand filter ($H(z^{-1})=1$)

In FIG. 11 the estimation filter is restored (and $\lambda=0.92$) but the demand filter is omitted (i.e. $H(z^{-1})=1$). Parameter estimation still progresses satisfactorily, but the position response is slightly more sensitive to modelling errors. Also noise has a greater effect on the control signal, and the vigorous nature of the signal causes excessive vibration of the plant structure.

Figure 12:
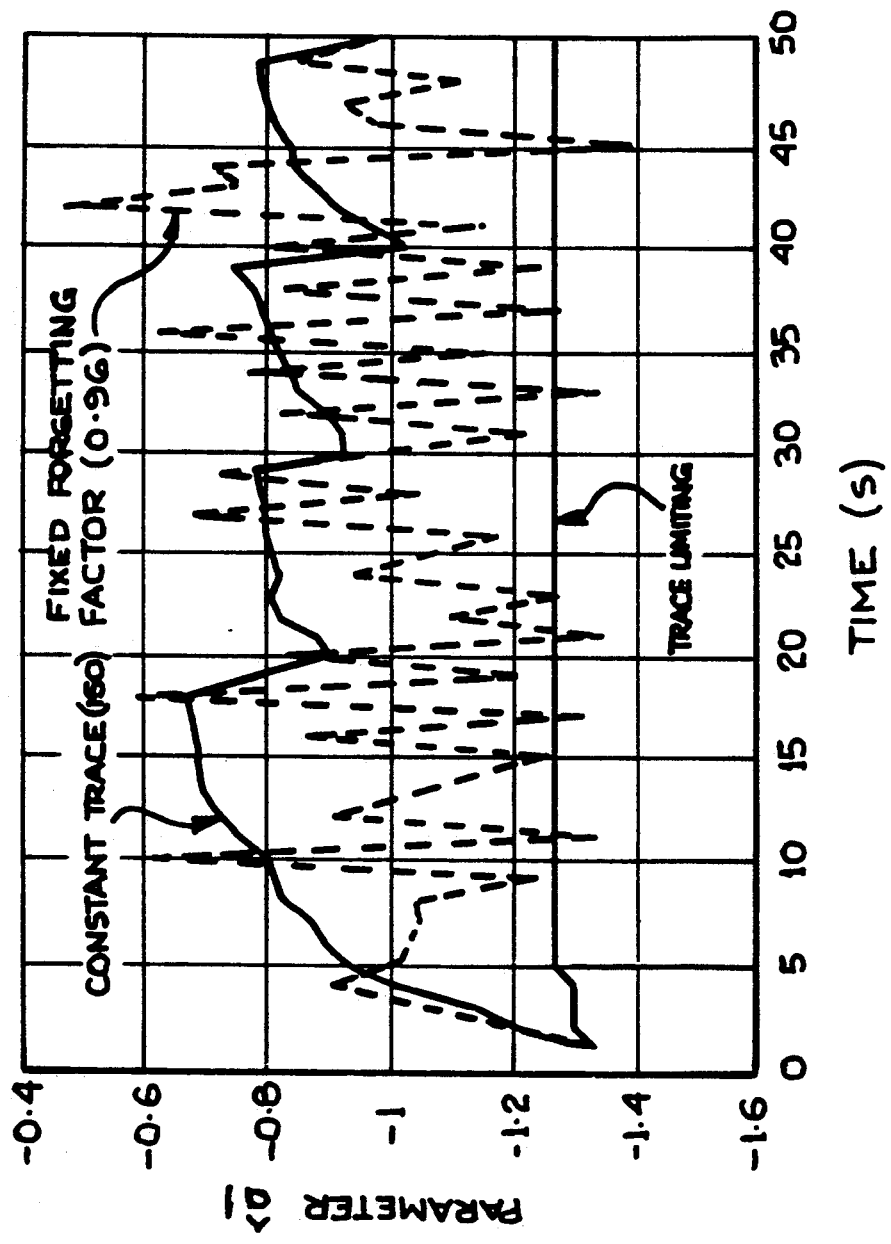
FIG. 12 shows the behaviour of the controller of FIG. 1 with different forgetting strategies when demand is stationary at zero.

To demonstrate the effectiveness of the trace limiting forgetting strategy, FIG. 12 compares different strategies when the demand signal is stationary at zero. The value of a typical parameter estimate ($\hat{a}_1$) is plotted every second over a 50 s period. For the constant trace estimator, the estimate drifts until after 18 s the corresponding controller becomes unstable, and the resulting load movement is sufficient to partly re-tune the model and controller. The same drifting occurs with a fixed forgetting factor, but the cycle of drifting and re-tuning is much faster. The covariance trace soon reaches its maximum value using the trace limiting algorithm, and so adaptation is switched off and the estimates do not drift.

The controller according to the invention as described above shows rapid adaptation to changes in plant characteristics, even when the changes are very significant and virtually instantaneous. An equivalent fixed coefficient controller breaks down in the same situation. The good performance is achieved despite the presence of many non-linear characteristics. The improvements made over other adaptive control algorithms applied to similar systems include a strategy which switches off adaptation if the trace of the covariance matrix becomes too great overcoming the difficulties caused by lack of excitation. Also, the use of data filtering in the recursive least squares estimator, and a demand filter in the pole placement controller represent improvements.

Off-line system identification is extremely useful as a basis for adaptive controller design. In particular it can be used to determine the structure of the plant model, to reduce the number of parameters to be adapted, and to provide initial estimates and variances for controller start-up.

I claim:

1. A servosystem comprising an adaptive digital controller with a demand input for a demand signal, a control output for a control signal to a system to be controlled, and feedback input for a feedback signal from the system to be controlled; said controller including an estimator having inputs arranged to receive the control signal from the control output and the feedback signal from the feedback input, said estimator including means for storing a predetermined mathematical model of the system to be controlled and a forgetting factor; whereby said estimator operates recursively in response to signals at said estimator inputs to estimate values of parameters of said mathematical model in successive estimation cycles and to store the estimated values of said parameters and to weigh stored values of said parameters from a previous estimation cycle with said forgetting factor before using these stored values with current values of said parameters to estimate new values of said parameters in each estimation cycle; said controller using the estimated values of said parameters to adapt the value of the control signal supplied to the control output; and said controller further including an excitation monitor having inputs arranged to receive the demand signal from the demand input and the feedback signal from the feedback input, said monitor including means for monitoring the dynamic variability of signals at said monitor inputs and means for storing a predetermined lower threshold value of dynamic variability below which the estimation cycle would otherwise have an adverse effect on said output control signal, whereby said excitation monitor operates to suspend adaptation of the output control signal by the controller when the dynamic variability falls below said predetermined lower threshold value.

2. A method of operating a servosystem comprising an adaptive digital controller which produces an output control signal to a system being controlled in response to an input demand signal and an input feedback signal from the system being controlled, the controller performing the steps of:
i) operating recursively in responses to the output control signal and feedback signal to estimate the values of parameters of a predetermined mathematical model of the system being controlled;
ii) making use of a forgetting factor to weigh previous values of said parameters before these values are used in combination with current values of said output control and feedback signals in each recursive estimation cycle;
iii) adapting said output control signal in accordance with said estimated values of the parameters;
iv) monitoring the dynamic variability of the input demand and feedback signals and suspending adaptation of said output control signal below a predetermined lower threshold of dynamic variability when the estimation cycle would otherwise have an adverse effect on said output control signal.

* * * * *